3,637,637
Patented Jan. 25, 1972

3,637,637
PROCESS FOR THE POLYMERIZATION OF ETHYLENE
Pietro Saccardo, Milan, Gianni Trada, Gozzano, Maurizio Galastri, Sesto San Giovanni, Milan, and Jean Herzenberg, Milan, Italy, assignors to Montecatini Edison S.p.A., Milan, Italy
No Drawing. Continuation-in-part of application Ser. No. 387,785, Aug. 5, 1964. This application Sept. 14, 1967, Ser. No. 667,678
Claims priority, application Italy, Aug. 9, 1963, 16,878/63
Int. Cl. C08f 1/66, 3/06
U.S. Cl. 260—94.9 D      11 Claims

ABSTRACT OF THE DISCLOSURE

A process for the polymerization of ethylene carried out in the presence of a catalytic system obtained by reacting chromyl fluoride with a carrier containing silicon compounds.

---

This application is a continuation-in-part of application Ser. No. 387,785 filed Aug. 5, 1964, now abandoned.

The present invention relates to the polymerization of ethylene and more particularly to a process for the polymerization of ethylene with the aid of catalytic systems of the type containing chromium, fluorine and silicon compounds.

The aforementioned application relates to the polymerization of alpha-olefins in the presence of a catalytic system consisting substantially of the reaction product of chromyl fluoride and a carrier containing silicon compounds.

In the commonly assigned copending application Ser. No. 379,608, filed July 1, 1964, now U.S. Pat. 3,412,041, entitled "Process for Producing Catalyst Compositions and the Product of this Process," improved catalyst compositions containing chromium, fluorine and silicon are disclosed. It has been proposed, prior to the discovery of these polymerization catalysts, to employ catalyst system for polymerizing alpha-olefins wherein chromic anhydride is deposited upon a catalyst support consisting of silica, alumina, or a silica-alumina. Deposition of the chromium compound on such supports is carried out by impregnating the catalyst carrier with a solution of chromic anhydride or soluble chromium salts which, upon heating, decompose to yield chromium trixodie.

The decomposition step is generally effected by calcination after drying of the impregnated carrier.

It is also known to polymerize alpha-olefins by means of a catalytic system wherein chromic anhydride is intimately mixed in a dry state (e.g. by grinding or blending) with one of the catalyst carriers mentioned above. Alternatively, the catalyst carrier and the chromic anhydride can be coprecipitated according to some earlier techniques to yield a system suitable for use in the preparation of polymers of alpha-olefins.

It is an object of the present invention to provide an improved method of polymerizing ethylene in high yields.

Another object of this invention is to provide a process for the polymerization of ethylene to yield polymers of particularly good physical and chemical characteristics.

Still another object is to provide a process for the polymerization of ethylene at relatively low temperatures and in the presence of liquid diluents so that the obtained polymer is formed in association with the catalyst and is suspended in the liquid diluent in form of solid particles which incorporate the catalyst. Another object is to provide a process which allows formation of a polymer in solid particle form in which the weight ratio between the polymeric material and the incorporated catalyst is so high that the characteristics of the polymer itself are not practically affected by the presence of the incorporated particles of catalyst. This is ascribable to the high activity of the catalysts used according to the present invention.

These objects and others are attained, in accordance with the present invention, by a method of polymerizing ethylene wherein polymerization is carried out in a liquid phase, i.e. a solvent, by means of a catalyst system whose carrier or support is composed of a silicon-containing material capable of reacting with chromyl fluoride. More specifically, the method may be deemed to comprise the step of polymerizing ethylene in an organic solvent, which is selected from aliphatic and cycloaliphatic hydrocarbons, in the presence of a catalyst system substantially consisting of the reaction product of chromyl fluoride and a silicon containing carrier, preferably containing silica. Such a catalyst constitutes the subject matter of the above-identified copending application Ser. No. 379,608, filed July 1, 1964.

As pointed out therein, the reaction of the chromyl fluoride with solid siliceous substances and, preferably, silicon dioxide results in a deposition of a solid composition of a chromium compound upon the support which thus bears on its surface, apparently chremically combined, active catalyst molecules containing the metal.

According to a theory of the invention, a homogeneous layer of the product of the reaction between chromyl fluoride and carrier is formed on the surface of the silica and acts as a barrier to further reaction of the chromyl fluoride with the carrier. Thus the reaction apparently terminates locally after the formation of a chromium compound which appears to be in a molecular layer.

This reaction, which can take place in gas phase under intimate contact conditions between the gaseous chromyl fluoride and the solid carrier containing silicon dioxide, occurs at relatively low temperatures and can be carried out at temperatures close to room temperatures.

It has in fact been observed that when chromyl fluoride is initimately contacted with a silicon containing carrier, as disclosed in the commonly assigned copending U.S. application Ser. No. 379,608, a reaction takes place and a chromium compound is formed on the carrier. The reaction ends when saturation of the carrier is reached and a further addition of chromyl fluoride does not increase the chromium content of the resulting catalyst.

It has further been observed that, during the reaction between chromyl fluoride and the silicon-containing carrier, fluorine is retained in the catalytic system. The amount of fluorine retained remains substantially unchanged even if the system is subjected to a heat treatment at a temperature in the range from 300° to 900° C.

These facts lead to the conclusion that a reaction actually takes place between chromyl fluoride and the silicon-containing carrier with consequent formation of fluorine and chromium-containing substances stable to heat treatment from 300° to 900° C.; the nature and structure of these substances have not yet been determined. This is in contrast to what is reported in the chemical literature on this subject according to which the following reaction should occur:

$$CrO_2F_2 + SiO_2 \rightarrow SiF_4 + 2CrO_3$$

(K Wiechert: Z. Anorg. Chemie, 261, 310–23, (1950)). 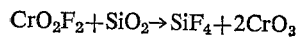
According to this reaction schema $SiF_4$, volatile, is formed as a by product.

In contrast to this we have found that during the reaction between $CrO_2F_2$ and the silicon-containing carrier, no significant evolution of $SiF_4$ occurred.

The reaction which takes place in the preparation of the catalytic system according to the invention appears therefore to be different from and more complex than the one referred in the literature cited above.

The catalytic systems prepared according to the above indicated method, require, in order to be effective in the polymerization of alpha-olefins, an heat treatment (or activation) in the presence of gases containing elemental oxygen or inert gases at a temperature ranging from 300° C. to 900° C. for a time ranging from one-half hour to twenty-four hours. However the preferred range of the activation temperature is from 400 to 600° C. and the duration of the activation is from one to five hours.

The chromyl fluoride which is used in the preparation of the catalytic system of this invention may be prepared according to any one of the known methods reported in the chemical literature. Among the different known methods for preparing $CrO_2F_2$ can be cited for example the one according to Engelbrecht and A. V. Grosse: J. Am. Chem. Soc. 74, 5262–4 (1952) by reacting $CrO_3$ with HF, or the method according to E. E. Ayusley, R. Nichols, and P. L. Robinson: J. Chem. Soc. 1953, 623–6, in which $CrO_3$ is reacted with $IF_5$: another method reported in literature describes the preparation of $CrO_2F_2$ by means of the reaction between $CrO_3$ and $CoF_3$ (G. D. Flesh, H. J. Svec, J. Am. Chem. Soc. 80, 3189–91—1958).

The chromyl fluoride can be prepared also by reacting $CrO_3$ with $SF_4$ according to H. L. Krauss and F. Schwarzbach: (Chem. Berichte 94, 1205–7 (1961)) or by means of the reaction between $CrO_3$ and $SeF_4$ according to the method of N. Bartlett and P. L. Robinson: (J. Chem. Soc. 3549–50 (1961)).

The silicon-containing carrier used in the preparation of the catalytic system according to this invention may be any inorganic compound containing silicon such as silica, and silica-alumina.

Although silica carriers give satisfactory results as regards polymerization rate and productivity of the catalyst, the best catalysts are obtained using as a carrier silica-alumina. These carriers are commercially available with different ratio between the two components i.e. silica and alumina.

All of these carriers are suitable for the preparation of the catalysts according to this invention and the catalytic system which can be prepared by reaction of them with $CrO_2F_2$ are generally highly effective.

However the best results have been obtained with catalysts prepared from silica-alumina carriers in which the ratio between silica and alumina is 87 and 13 by weight.

The polymerization reaction may be carried out in the absence of solvents or diluents; however it has proved to be advantageous to carry out the process in the presence of inert solvents or diluents.

The organic solvent may be an aliphatic or cycloaliphatic hydrocarbon in which the polymer and/or monomer is soluble. Suitable solvents are propane, butane, isobutane, n-heptane, n-pentane, isooctane and cyclohexane.

The solvent action with respect to the polymer depends on the temperature at which the polymerization process is carried out; by operating at relatively high temperatures the polymer formed is dissolved in the solvent, while by operating at relatively low temperatures, the polymer formed is substantially insoluble in the solvent and therefore precipitates in solid-particle form.

Polymerization of the ethylene is advantageously carried out at temperatures below 210° C.

However the polymerization temperature may vary within wide limits according to whether a solution of the polymer in the solvent or a polymer in particle form is desired as final product.

In the polymerization of ethylene good results are generally obtained by operating at temperatures lower than 210° C.

When a solution of polyethylene in the solvent is desired, the more effective temperatures are within the range from 130° to 210° C.; when, on the other hand, a polymer in particle form is desired the polymerization is carried out preferably within the range from 60° to 120° C.

The pressure under which the reaction can be carried out is not critical and should be sufficient to maintain the solvent or diluent in a liquid state at the operating temperatures. Moreover, the pressure must be so high to ensure that enough ethylene will dissolve in the solvent, for a satisfactory rate of the polymerization process. Although very high values of pressure can be used advantageously, usually pressures below 200 atm. are used, and preferably in the range from 10 to 80 atm.

The catalytic system is, according to this invention, activated by heating and thereafter brought into contact with ethylene at the predetermined temperature and pressure conditions. At the end of the polymerization reaction, the catalytic system is separated from the polymer and solvent, and can be subjected to activation by heating in the presence of oxygen, air or an inert gas. The polymer can then also be freed from the solvent.

Alternatively, by operating at relatively low temperatures, within the above-mentioned limits, the polymer as it forms, precipitates and it is recovered at the end of the polymerization in form of solid particles incorporating the catalyst. According to this embodiment, the catalyst remains associated with the polymer. Due to the high activity of the catalysts according to the present invention the amount of polymer produced per gram of catalyst is very high; therefore the polymer recoverd in form of solid particles is associated with such extremely small amounts of catalyst as not to affect substantially the physical and chemical characteristics of the polymer itself. However if desired the catalyst may also be removed partially or completely from the polymer by means of the usual operations known in the art.

Subsequently, the solvent is removed from the polymers by any customary means.

An advantage of the present process resides in the usually high yields of polymer with respect to the quantity of the monomer used and the catalyst, as well as the high degree of crystallinity of the product. The polymer thus possesses excellent physical and chemical properties and is highly adaptable to existing technological methods of processing the synthetic resins. It is believed that these unexpected advantages, particularly the improved physical characteristics of the polymer, can be ascribed to the unique structure of the catalyst system. There is evidence that the chromium compounds are deposited from chromyl fluoride on the carrier through a reaction therebetween and that the resulting catalysts contain fluorine atoms chemically linked to catalyst itself. It is believed that these facts contribute to the marked improvement in the effectiveness of the catalysts according to the present invention as compared with earlier chromium-oxide catalysts.

For this reason, it is believed that the catalytic activity is a function of the entire catalytic system formed by the chromium compounds and the carrier, the latter having an unusual reaction-promoting function different from and in addition to its supporting function.

The invention will be more readily apparent from the following specific examples which are given to better evidenciate the inventive idea of the present invention without thereby departing from the spirit and scope thereof.

EXAMPLE 1

Preparation of catalytic system

The equipment was constituted by a stainless steel reactor connected with a three neck glass flask by a small joint of polyvinylchloride, reaching to the bottom of the flask.

The chromyl fluoride was prepared to the reactor by reacting 4 grams of chromic anhydride with 4 grams of cobaltic fluoride previously finely ground together in a "dry box."

In this reactor the temperature was brought in a period of 2 hours up to 450° C. and kept for 1 hour at this level.

Contemporaneously a stream of dry nitrogen was introduced from the bottom of the reactor to carry the $CrO_2F_2$ through the joint into the glass flask, in which there had previously been placed 30 grams of silicon dioxide (sold by the firm Ketjen). In the flask the temperature was maintained for the duration of the reaction at 80–90° C.

The heating of the two units was interrupted when the catalyst contained the desired quantity of chromium and then the catalyst was extracted from the flask.

The catalyst thus prepared was activated in another reactor where it was maintained in a fluid bed by a current of oxygen flowing at a rate of 20 liters/h.

The temperature was maintained for two hours at 500–540° C. At the end of this period, still feeding in oxygen, cooling was started to bringing the temperature down to 400° C. This cooling was then continued in a stream of nitrogen to room temperature. This catalyst, thus prepared and activated, turned out to contain after activation:

1.49% by weight of chromium, based on the total catalyst,
1.34% by weight of hexavalent chromium, based on the total catalyst,
1.76% by weight of fluorine, based on the total catalyst.

Preparation of polyethylene 5 grams of the catalytic system thus prepared and activated, were introduced into a 2000 cc. stainless steel autoclave, provided with a central stirrer and containing 330 cc. of n-heptane. After having heated the autoclave for half an hour under vacuum at 70°–80° C., a suspension of the catalyst in 150 cc. of n-heptane was drawn into the autoclave.

Subsequently ethylene was introduced into the autoclave up to a pressure of 15 atm.

The temperature was then increased to 120° C. and further ethylene was introduced to a pressure of 40 atm.

The temperature, owing to the exothermicity of the reaction, increased spontaneously to 140° C. and it was maintained at this value for 1 hour.

The feeding of ethylene was then interrupted, the autoclave was cooled to about 120° C. and, at this temperature, the unreacted ethylene was discharged.

After complete cooling, the recovered polymer was dried in a stove at 110° C. for a few hours under vacuum.

225 grams of solid polyethylene, were obtained corresponding to 45 g. of polymer per gram of catalyst per hour, corresponding to 3020 g. of polymer per gram of metallic chromium present in the catalyst per hour.

EXAMPLE 2

9.7 grams of the catalytic system prepared and activated as in Example 1 were introduced into the autoclave containing 640 cc. of n-heptane.

Ethylene was polymerized at a pressure of 40 atm. and at a temperature of 140° C. for 1 hour, according to the procedures described in Example 1.

388 grams of polyethylene were obtained corresponding to 40 grams of polymer per gram of total catalyst per hour and corresponding to 2680 gr. of polymer per gram of metallic chromium present in the catalyst per hour.

EXAMPLES 3 TO 14

Preparation of catalytic system

A catalytic system was prepared as described in Example 1, by using silica-alumina instead of silicon dioxide.

Microspheroidal, macroporous silica-alumina having a ratio silica-alumina of 87:13 by weight was used.

The catalytic system thus prepared was activated as described in Example 1.

The characteristics of the catalyst, the polymerization conditions, the yields concerning the examples from 3 to 14 are listed in the attached Table I.

TABLE I

| Example No. | Chromium content in the catalyst, percent by weight | Hexavalent chromium content in the catalyst after activation, percent by weight | Flourine content in the catalyst after activation, percent by weight | Solvent | Quantity of catalysts used in grams | Quantity of solvent, cc. | "Concentration" catalyst into the solvent, gr./100cc. | "Concentration" chromium into the solvent, mgr./100 cc. | Temperature, ° C. | Pressure, atm. | Duration, hrs. | Quantity of solid polymer obtained, grams | Yield per hour on the catalyst, g./g./h. | Yield per hour on metallic chromium g./g./h. |
|---|---|---|---|---|---|---|---|---|---|---|---|---|---|---|
| 1 | 1.49 | 1.34 | 1.76 | n-heptane | 5 | 330 | 1.51 | 22.57 | 140 | 40 | 1 | 225 | 45 | 3,020 |
| 2 | 1.49 | 1.34 | 1.76 | do | 9.7 | 640 | 1.51 | 22.58 | 140 | 40 | 1 | 388 | 40 | 2,680 |
| 3 | 2.31 | 2.08 | 1.8 | do | 4.95 | 330 | 1.50 | 34.65 | 150 | 40 | 1 | 367 | 74 | 3,210 |
| 4 | 2.31 | 2.08 | 1.8 | do | 4.8 | 320 | 1.50 | 34.49 | 150 | 40 | 1 | 325 | 67.5 | 2,930 |
| 5 | 2.31 | 2.08 | 1.8 | do | 4.60 | 308 | 1.49 | 34.65 | 150 | 40 | 1 | 308 | 67 | 2,900 |
| 6 | 2.31 | 2.08 | 1.8 | do | 4.50 | 300 | 1.50 | 34.71 | 150 | 40 | 1 | 355 | 79 | 3,410 |
| 7 | 2.31 | 2.08 | 1.8 | do | 5.35 | 356 | 1.50 | 34.49 | 150 | 40 | 1 | 374 | 70 | 3,030 |
| 8 | 2.31 | 2.08 | 1.8 | do | 5.60 | 375 | 1.49 | 34.49 | 150 | 40 | 1 | 437 | 78 | 3,380 |
| 9 | 2.31 | 2.08 | 1.8 | do | 5.45 | 365 | 1.49 | 34.49 | 150 | 40 | 1 | 479 | 88 | 3,800 |
| 10 | 2.31 | 2.08 | 1.8 | do | 6.30 | 420 | 1.5 | 34.65 | 150 | 40 | 1 | 507 | 80.5 | 3,480 |
| 11 | 2.31 | 2.08 | 1.8 | do | 6.00 | 400 | 1.5 | 34.79 | 150 | 40 | 1 | 408 | 68 | 2,940 |
| 12 | 2.31 | 2.08 | 1.8 | do | 5.95 | 395 | 1.5 | 34.65 | 150 | 40 | 1 | 435 | 73 | 3,160 |
| 13 | 2.31 | 2.08 | 1.8 | do | 4.60 | 306 | 1.5 | 34.72 | 150 | 40 | 1 | 435 | 94.5 | 4,090 |
| 14 | 2.31 | 2.08 | 1.8 | do | 3.58 | 240 | 1.5 | 34.45 | 150 | 40 | 1 | 405 | 113 | 4,900 |

EXAMPLE 15

The equipment was constituted by two stainless steel reactors connected together by a small joint of polyvinylchloride and placed one over the other.

4 g. of $CrO_3$ previously dried under vacuum at 110° C. for 8 hours and 4 g. of $CoF_3$, finely ground together in a "dry-box" were placed into the lower reactor.

In this reactor the temperature was brought in a period of 2 hours up to 450° C. and kept for 1 hour at this value. Contemporaneously a stream of dry nitrogen was introduced from the bottom of the reactor to entrain the $CrO_2F_2$ which had formed, through the joint, into the lower part of the higher reactor containing 30 g. of silica-alumina previously dried in a current of nitrogen at 300° C. for 4 hours and maintained in a fluid bed by the nitrogen stream containing $CrO_2F_2$. In this second reactor the temperature was maintained for the duration of the reaction at 80–90° C.

Microspheroidal, macroporous silica-alumina, with a ratio silica-alumina of 87:13 by weight was used.

The catalyst thus prepared was activated as described in Example 1 and thereafter was found to contain, 1.45% by weight of chromium and 1.10% by weight of fluorine.

2.5 g. of this catalyst were introduced into a steel autoclave having a capacity of 1000 cc., provided with a mechanical propeller-type stirrer.

The ethylene was polymerized according to the procedure described in Example 1 at a temperature of 150° C. and under a pressure of 40 atm.

163 grams of polyethylene were obtained corresponding to 4500 grams of polymer per gram of chromium contained in the catalyst per hour.

EXAMPLE 16

250 g. of silica alumina of the type used in Example 15, previously dried at 300° C. for 2 hours in a stream of nitrogen, were placed into a three neck glass flask.

Through a tube of polyvinyl chloride reaching the bottom of the flask, a current of nitrogen and chromyl fluoride, produced as in Example 15, was fed in.

After about 2 hours, during which the flask was maintained at 80–90° C., the catalyst was extracted from the flask and the activation was carried out according to the procedures described in Example 15.

This catalyst contained after the activation 1.15% by weight of chromium and 1.28% by weight of fluorine.

6.7 g. of the catalyst was suspended in 450 cc. isooctane.

A stainless steel autoclave having a capacity of 2000 cc., provided with a mechanical propeller-type stirrer, was heated for 30 minutes at 100° C. while producing a vacuum therein and then, through a nozzle the catalyst suspension was drawn in.

Ethylene was then introduced up to obtaining a pressure of 15 atm.; it was heated up to 120° C. and further ethylene was introduced up to a pressure of 40 atm.

The polymerization was carried out for 1 hour by maintaining the pressure at 40 atm. by the continuous addition of ethylene and by keeping the temperature around 150° C. The feeding of ethylene was then interrupted, the autoclave was cooled to about 120° C. and the unreacted ethylene was discharged by venting.

The polymer thus formed, which during the reaction was kept dissolved in the solvent, precipitated upon cooling, thus separating from the liquid phase. The obtained polyethylene was dried in a stove at 110° C. under vacuum for several hours. 361 g. of polymer were thus obtained.

EXAMPLE 17

Into a 500 cc. stainless autoclave, provided with a mechanical propeller-type stirrer, there was introduced 210 cc. of n-heptane and 3.15 g. of the same catalyst used in Example 14 having a chromium content of 2.31% contained in a glass-tube which was crushed at a temperature of 80° C.

Subsequently ethylene was introduced at a temperature of about 90° C. until obtaining a pressure of 15 atm. It was heated to about 100° C. and further ethylene was introduced to a pressure of 40 atm.

The polymerization was carried out maintaining the pressure at 40 atm. by the continuous addition of ethylene and maintaining the temperature around 90–100° C. for 5 hours.

The polymer precipitated as soon as it was formed.

The obtained polyethylene was separated and dried in a stove at 110° C., under vacuum for a few hours.

1610 g. of polymer, corresponding to about 102 g. of polyethylene per gram of catalyst used per hour were obtained.

EXAMPLE 18

Into a 500 cc. stainless steel autoclave provided with a mechanical propeller stirrer, there were introduced 375 cc. of n-heptane and 3.65 g. of the same catalyst used in Example 14, contained in a glass tube which was crushed at 80° C.

The polymerization of ethylene was carried out as in the preceding example under a pressure of 40 atm. and at a temperature between 80°–100° C.

The polymer precipitated under the form of white particles not swollen by the solvent.

1670 g. of polyethylene, corresponding to about 114.5 g. of polymer per gram of catalyst per hour were thus obtained.

EXAMPLE 19

3.72 grams of the same catalyst as prepared as in Example 14 were introduced into a 500 cc. stainless steel autoclave containing 372 cc. of n-heptane.

The ethylene was polymerized by operating according to Example 17 under a pressure of 40 atm. and at a temperature of 80°–90° C. This temperature was maintained for 2 hours.

440 grams of solid polyethylene were obtained corresponding to 59 grams of polymer per gram of catalyst per hour.

EXAMPLE 20

3.9 grams of the same catalyst as in Example 14 were introduced into an autoclave containing 552 cc. of n-heptane.

The polymerization of ethylene was carried out as described in Example 17 at 40 atm. and at 80° C.

After 1 hour were obtained 438 grams of solid polyethylene corresponding to 112.5 grams of polymer per gram of catalyst per hour.

EXAMPLE 21

A catalyst containing, after activation, 0.63% by weight of chromium and 0.50% by weight of fluorine was prepared and activated according to the same procedure of Example 15.

2.6 g. of this catalyst were introduced in a 1000 cc. stainless steel autoclave equipped with a mechanical propeller stirrer.

The polymerization of ethylene was carried out according to the procedure described in Example 1.

The temperature, owing to the exothermicity of the reaction, increased spontaneously up to a maximum of 154° C. and was then maintained for 1 hour at 140° C.

189 g. of polyethylene were thus obtained corresponding to 11,540 g. of polymer per gram of chromium per hour.

EXAMPLE 22

Preparation of catalyst system

A catalytic system was prepared in the following manner: 10 grams of thoroughly dried chromic anhydride $CrO_3$ were introduced into a stainless-steel reactor fitted with an inlet pipe and outlet pipe at the upper end of the reactor.

Through the inlet pipe, a mixture of nitrogen ($N_2$) and hydrogen fluoride (HF) were fed into the reactor, the chromium oxyfluoride ($CrO_2F_2$) formed by the reaction ($CrO_3 + 2HF \rightarrow CrO_2F_2$) of the hydrogen fluoride with the chromic anhydride passed out of the reactor in the nitrogen stream via the outlet pipe and then through a purifying column. The chromium oxyfluoride was then admitted to a second reactor containing 30 grams of silica-alumina (87% by weight silica and 13% by weight alumina). After 1 hour, the feeding of HF was terminated, the nitrogen was replaced by oxygen and the reactor containing the silica-alumina was heated to 200° C. and activation was continued at this temperature for 18 hours.

Preparation of polyethylene 2.40 grams of the catalyst system as thus prepared was heated for 2 hours at 540° C., in a dry-air atmospheric then the catalyst was cooled and introduced into a 500 cc. autoclave containing 250 cc. of cyclohexane. Ethylene was introduced into the autoclave and the internal temperature was brought down to 133° C. As the pressure, in the autoclave fell, further quantities of ethylene were introduced. After a reaction time of about 2.5 hours, the feeding of ethylene to the autoclave was stopped and the autoclave cooled. The reaction product contained in the autoclave consisted of white solid polyethylene: 148 grams of polymer, corresponding to 24.5 grams of polyethylene per gram of catalyst per hour were obtained.

EXAMPLE 23

2.40 grams of a catalytic system prepared as described in part 1 of Example 22 was heated for 2 hours at 510° C. in dry air; the catalyst was then cooled and suspended in 250 cc. of cyclohexane. The suspension was introduced into a 500 ml. autoclave, into which ethylene was subsequently introduced. The autoclave was then heated to 143° C. and the pressure was maintained at 36 atm. for 3 hours, whereupon introduction of ethylene was discontinued and the autoclave cooled and opened. After elimination of the solvent and removal of the catalyst system, the reaction product was found to be 115 grams of solid, white polyethylene of highly crystalline structure, corresponding to 16 grams of polymer per gram of catalyst per hour.

EXAMPLE 24

1.46 grams of the same catalyst used in Example 23 was heated to 520° C. for 2 hours in a dry-air atmosphere; the catalyst was then cooled and introduced into an autoclave containing 250 ml. of cyclohexane. Polymerization of the ethylene was carried on for 2½ hours at 143° C. and at about 37 atm. 53 grams of solid white polyethylene was obtained, corresponding to 14.5 grams of polymer per gram of catalyst per hour.

EXAMPLE 25

3.20 grams of a catalyst system prepared as described in part 1 of Example 22 was heated in dry air at 500° C. for 2 hours. After cooling, the catalyst was introduced into a 1 liter autoclave containing 500 ml. of cyclohexane. The autoclave was next heated to 145° C. and was supplied with ethylene at a pressure of 40 atm. After two hours the feeding of ethylene was terminated and the autoclave cooled. In this way 80 grams of a solid, white polyethylene of high crystallinity was obtained, corresponding to 12.5 grams of polymer per gram of catalyst per hour.

EXAMPLE 26

A catalyst system was prepared as described in Example 22; it contained 1.50% by weight chromium. This catalyst system was thereupon suspended in cyclohexane at a concentration corresponding to 0.7 gram of catalyst per 100 ml. of cyclohexane, and this suspension was next introduced into a 500 ml. autoclave fitted with a central anchorshaped stirrer. Ethylene was polymerized in the presence of this suspended catalystic system at a pressure of 36 atm. and at 140° C. for 2½ hours, 52 grams of solid white polyethylene were obtained.

EXAMPLE 27

1.90 grams of a catalyst system, prepared as described in Example 22, was activated for 2 hours at 510° C. in the presence of a dry-air atmosphere; the catalyst was cooled and suspended in 250 ml. of cyclohexane. The suspension was introduced into a 500 ml. autoclave into which ethylene was subsequently introduced. The autoclave was next heated to 137° C. and the pressure was maintained around 36 atm. for 2 hours, whereupon the supply of ethylene was stopped; the autoclave was then cooled and opened. After elimination of the solvent and the catalyst system, the resulting reaction product consisted of 54 grams of solid white and highly crystalline polyethylene, corresponding to 14.2 grams of polymer per gram of catalyst per hour.

EXAMPLE 28

A catalyst was prepared by conveying a gaseous stream containing chromyl fluoride through a silica-alumina bed (87% by weight silica and 13% by weight alumina, obtained from Davison Co.), according to the process described in Example 1. 10 grams of this catalyst was activated in a stream of dry nitrogen at 350° C. for 2½ hours, then cooled (still in the nitrogen stream). This catalyst, containing 2.53% by weight chromium was suspended in 150 ml. of n-heptane.

The suspension of the catalyst in n-heptane was introduced into a 1000 ml. autoclave, previously purged with nitrogen and equipped with a central stirrer. The autoclave was then heated to 150° C. and ethylene at a pressure of 40 atm. subsequently introduced. The autoclave was maintained at 150° C. and 40 atm. for 1 hour, after which it was vented, cooled and opened. After elimination of the solvent, 120 g. of a solid white polymer were obtained corresponding to 12 grams of polymer per gram of catalyst per hour; the polymer was found to be linear polyethylene.

EXAMPLE 29

2.3 grams of a catalytic system prepared as described in Example 22 was heat-treated under vacuum for 24 hours, thereupon it was heated for 2 hours at 540° C. as a fluid bed in a dry air stream. The resulting catalyst contained 1.16% by weight chromium and 1.55% by weight fluorine. After cooling in a nitrogen stream, this catalyst was suspended in 150 ml. of n-heptane and introduced into a 1000 ml. autoclave. Into the same autoclave some ethylene was also introduced at a pressure of about 15 atm. and the temperature raised to 140° C. By further addition of ethylene the pressure was increased to 40 atm. at which it was maintained during the entire reaction while the temperature reached a maximum value of 176° C. After 1 hour the autoclave was vented and 215 grams of polyethylene were recovered, corresponding to 93.5 grams of polymer per gram of catalyst per hour.

EXAMPLE 30

2.7 grams of a catalytic system prepared as described in Example 22 were heated at 540° C. for two hours in a fluidized bed in a stream of dry air. After cooling in a nitrogen stream, the catalyst containing 0.78% by weight chromium and 1.59% by weight fluorine was suspended in 300 ml. of n-heptane and introduced into a 1000 ml. autoclave into which some ethylene was supplied at a pressure of about 15 atm.; the temperature was raised to 160° C. By further additions of ethylene, the pressure was increased to 40 atm., at which it was maintained throughout the course of the reaction. After 1 hour the autoclave was vented and 124 grams of polyethylene were recovered, corresponding to 46 grams of polymer per gram of catalyst per hour.

EXAMPLE 31

8.2 grams of a catalytic system prepared as described in Example 22 were heated for two hours at 520° C. as a fluidized bed in a stream of dry air. After cooling in a stream of nitrogen, the catalyst containing 1.10% chromium and 1.09% fluorine was suspended in 150 ml. of n-heptane and introduced into a 1000 ml. autoclave, to which some ethylene at a pressure of about 15 atm. was supplied, while the temperature was raised to 140° C. By adding more ethylene, the pressure was increased to 38 atm. at which it was maintained throughout the course of the reaction. After 1 hour from the start of the reaction the autoclave was vented and 251 grams of polyethylene were obtained, corresponding to 30.5 grams of polymer per gram of catalyst per hour. From an X-ray examination of the product, the polyethylene showed a 78% crystallinity. The intrinsic viscosity of this polymer measured in a Decalin decahydronaphthalene solution at 135° C. was 1.65.

Upon I.R. examination, the polyethylene evidenced a straight-chain structure without significant branching.

EXAMPLE 32

A catalytic system prepared as described in Example 22 and having 1.16% by weight of chromium and 1.89% by weight of fluorine, was activated in a current of dry air at 500° C. for 2 hours and then maintained under nitrogen atmosphere. A 2000 ml. stainless steel autoclave, fitted with a central stirrer and with heating and cooling devices, was filled to about ⅓ of its volume with n-heptane, and then ethylene to a pressure of 15 atmospheres was supplied.

Then the catalyst (in an amount equal to 2.16 gr. for every 100 ml. of solvent) was introduced; the temperature was raised to 140° C. and the pressure increased to 40 atm. by adding further ethylene.

These temperature and pressure conditions were maintained unchanged for the whole polymerization test. After 1 hour from the beginning of the polymerization reaction the autoclave was discharged and the solvent was removed from the obtained polymer. 307 grams of polyethylene were obtained corresponding to 38.5 grams of polymer per gram of catalyst per hour and corresponding to 3310 grams of polymer per grams of chromium per hour.

EXAMPLE 33

By operating at about the same conditions as described in Example 32, 305 grams of polyethylene were obtained corresponding to 37 grams of polymer per gram of catalyst per hour and corresponding to 3210 grams of polymer per gram of chromium per hour.

EXAMPLE 34

For comparative purposes a catalyst was prepared according to that described in Example 1, by using gamma-alumina Ketjen instead of silicon dioxide.

Such a catalyst showed a non homogeneous distribution of the chromium compound on the carrier; furthermore remarkable quantities of $CrO_2F_2$ were not retained by gamma-alumina.

The catalyst was activated as in Example 1 and showed the following characteristics:

| | Percent by weight |
|---|---|
| Total chromium content | 1.34 |
| Hexavalent chromium content | 0.78 |
| Fluorine content | 0.38 |

The ethylene was polymerized at the same conditions reported in Example 1.

62 grams of polyethylene were obtained corresponding to 8 grams of polymer per gram of catalyst per hour and corresponding to 600 grams of polymer per gram of metallic chromium per hour.

TABLE II

| Example No. | Chromium content in the catalyst, after activation, percent by weight | Hexavalent chromium content in the catalyst after activation, percent by weight | Fluorine content in the catalyst after activation, percent by weight | Solvent | Quantity of catalyst used in grams | Quantity of solvent, cc. | "Concentration" catalyst into the solvent, gr./100 cc. | "Concentration" chromium into the solvent, mg./100 cc. | Temperature, °C. | Pressure, atm. | Duration, hrs. | Quantity of solid polymer obtained, grams | Yield per hour on the catalyst, g./g./h. | Yield per hour on metallic chromium, g./g./h. |
|---|---|---|---|---|---|---|---|---|---|---|---|---|---|---|
| 15 | 1.45 | (¹) | 1.10 | n-Heptane | 2.5 | 150 | 1.67 | 24.16 | 150 | 40 | 1 | 163 | 65 | 4,500 |
| 16 | 1.15 | (¹) | 1.28 | Iso-Octane | 6.7 | 450 | 1.49 | 17.12 | 150 | 40 | 1 | 361 | 54 | 4,690 |
| 17 | 2.31 | 2.08 | 1.8 | n-Heptane | 3.15 | 210 | 1.50 | 34.65 | 90-100 | 40 | 5 | 1,610 | 102 | 4,430 |
| 18 | 2.31 | 2.08 | 1.8 | do | 3.65 | 375 | 0.97 | 22.48 | 80-100 | 40 | 4 | 1,670 | 114.5 | 4,950 |
| 19 | 2.31 | 2.08 | 1.8 | do | 3.72 | 372 | 1.0 | 23.10 | 80-90 | 40 | 2 | 440 | 59 | 2,560 |
| 20 | 0.63 | 2.08 | 0.50 | do | 3.9 | 552 | 0.71 | 16.32 | 140 | 40 | 1 | 438 | 112.5 | 4,860 |
| 21 | 2.80 | (¹) | (¹) | do | 2.60 | 250 | 1.73 | 26.88 | 133 | 40 | 2½ | 189 | 72.5 | 11,540 |
| 22 | 1.86 | 1.73 | (¹) | Cyclohexane | 2.40 | 250 | 0.96 | 17.85 | 143 | 38 | 3 | 148 | 24.5 | 1,880 |
| 23 | 1.86 | 1.73 | (¹) | do | 1.46 | 250 | 0.58 | 10.86 | 145 | 37 | 2½ | 115 | 16 | 860 |
| 24 | 1.67 | 1.48 | (¹) | do | 3.20 | 500 | 0.64 | 10.68 | 140 | 40 | 2 | 53 | 14.5 | 780 |
| 25 | 1.50 | 1.01 | (¹) | do | 1.78 | 250 | 0.7 | 9.95 | 146 | 36 | 2½ | 80 | 12.5 | 750 |
| 26 | 2.63 | 1.15 | (¹) | do | 1.90 | 250 | 0.76 | 9.5 | 137 | 36 | 1 | 52 | 11.7 | 780 |
| 27 | 1.31 | (¹) | (¹) | do | 1.10 | 150 | 0.66 | 168.66 | 140 | 40 | 1 | 54 | 14 | 470 |
| 28 | 0.78 | (¹) | 1.65 | do | 2.3 | 150 | 6.66 | 17.78 | 150 | 40 | 1 | 120 | 12 | 1,080 |
| 29 | 1.10 | (¹) | 1.69 | do | 2.7 | 300 | 1.53 | 7.02 | 176 | 38 | 1 | 215 | 93.5 | 8,060 |
| 30 | 1.16 | (¹) | 1.09 | do | 3.2 | 150 | 0.90 | 60.13 | 160 | 40 | 1 | 124 | 46 | 5,890 |
| 31 | 1.16 | (¹) | 0.89 | n-heptane | 8.2 | 150 | 5.47 | 26.08 | 140 | 40 | 1 | 251 | 30.5 | 2,780 |
| 32 | 1.16 | (¹) | 0.89 | do | 8.0 | 370 | 2.16 | 24.59 | 140 | 40 | 1 | 307 | 38.5 | 3,310 |
| 33 | 1.16 | (¹) | 0.89 | do | 8.2 | 385 | 2.12 | 22.4 | 140 | 40 | 1 | 305 | 37 | 3,210 |
| 34 | 1.34 | 0.78 | 0.38 | do | 7.8 | 330 | 1.51 | | 140 | 40 | 1 | 62 | 8 | 600 |

¹ Not determined.

What is claimed is:

1. A method of producing polyethylene, comprising the step of polymerizing ethylene in the presence of an organic solvent and in the presence of a catalyst system constituting the reaction product of chromyl fluoride and a silica-containing carrier, at an ethylene-polymerization temperature below substantially 210° C. and at a superatmospheric pressure below substantially 200 atmospheres, said catalyst system being activated by heating it in an atmosphere selected from the group consisting of a gas containing elemental oxygen and inert gases at a temperature between substantially 300° and 900° C. for a period of 0.5 to 24 hours.

2. The method defined in claim 1 wherein said catalyst carrier is selected from the group consisting of silicas and silica-aluminas.

3. The method defined in claim 1 wherein the temperature of activation of said catalyst system ranges between substantially 400° C. and 600° C.

4. The method defined in claim 1 wherein said atmosphere consists essentially of dry nitrogen.

5. The method defined in claim 1 wherein said gas containing elemental oxygen is dry atmospheric air.

6. The method defined in claim 1 wherein said atmosphere consists essentially of oxygen.

7. The method defined in claim 1 wherein the temperature at which ethylene is polymerized ranges between substantially 60 and 120° C.

8. The method defined in claim 7 wherein the polymer is at least partially precipitated during the polymerization.

9. The method defined in claim 7 wherein the catalyst is at least partially retained in the polymer after polymerization.

10. The method defined in claim 7 wherein polymerization is carried out at a pressure between substantially 10 and 80 atmospheres.

11. The method defined in claim 10 wherein said organic solvent is selected from the group consisting of aliphatic and cycloaliphatic hydrocarbons.

References Cited

UNITED STATES PATENTS

| | | | |
|---|---|---|---|
| 2,825,721 | 3/1958 | Hogan et al. | 260—94.9 |
| 3,346,511 | 10/1967 | Hill et al. | 252—455 |
| 3,130,188 | 4/1964 | Hogan | 260—94.9 |
| 3,166,544 | 1/1965 | Orgechowski et al. | 260—93.7 |
| 3,412,041 | 11/1968 | Saccardo et al. | 252—455 |

FOREIGN PATENTS 1,423,693 11/1965 France.

JOSEPH L. SCHOFER, Primary Examiner

E. J. SMITH, Assistant Examiner

U.S. Cl. X.R.

252—455, 458